United States Patent
Dolgin et al.

(10) Patent No.: US 11,127,111 B2
(45) Date of Patent: Sep. 21, 2021

(54) SELECTIVE ALLOCATION OF PROCESSING RESOURCES FOR PROCESSING IMAGE DATA

(71) Applicant: QUALCOMM Incorporated, San Diego, CA (US)

(72) Inventors: Yuri Dolgin, Haifa (IL); Yuval Schwartz, Haifa (IL); Dorit Nehama, Zichron Yaacov (IL); Itay Goldoft, Ganei Tikva (IL); Yoav Lindner, Tel Aviv (IL); Costia Parfenyev, Haifa (IL); Dov Bukin, Qiryat Motzkin (IL); David Berrebi, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/684,217

(22) Filed: Nov. 14, 2019

(65) Prior Publication Data

US 2021/0150666 A1 May 20, 2021

(51) Int. Cl.
*G06T 3/00* (2006.01)
*G06T 3/40* (2006.01)
*G06T 5/00* (2006.01)
*G06T 5/20* (2006.01)

(52) U.S. Cl.
CPC .............. *G06T 3/0093* (2013.01); *G06T 3/40* (2013.01); *G06T 5/002* (2013.01); *G06T 5/003* (2013.01); *G06T 5/20* (2013.01)

(58) Field of Classification Search
None
See application file for complete search history.

(56) References Cited

U.S. PATENT DOCUMENTS

| | | | | |
|---|---|---|---|---|
| 6,577,312 | B2* | 6/2003 | Deering | G06T 5/20 345/428 |
| 2007/0242900 | A1* | 10/2007 | Chen | H04N 5/2355 382/294 |
| 2007/0280555 | A1* | 12/2007 | Chen | G06T 3/0081 382/294 |
| 2017/0345136 | A1* | 11/2017 | Van der Auwera | H04N 5/23238 |
| 2018/0181809 | A1* | 6/2018 | Ranjan | G06K 9/00986 |
| 2019/0347763 | A1* | 11/2019 | Goel | G06T 7/20 |

OTHER PUBLICATIONS

Zhang C., et al., "Non-Uniform Sampling of Image-Based Rendering Data with the Position-Interval-Error (PIE) Function", Department of Electrical and Computer Engineering, Carnegie Mellon University, 2003, pp. 1-12.

* cited by examiner

*Primary Examiner* — Tize Ma
(74) *Attorney, Agent, or Firm* — QUALCOMM Incorporated

(57) ABSTRACT

In general, techniques are described regarding selective allocation of processing resources for processing image data. Processing circuitry may warp a frame of image data around variously indicated areas of the frame to create a warped frame of image data. The processing circuitry may allocate more pixels to the indicated areas by virtue of the frame warping operation. The warped frame may then be output for further processing in accordance with proportions of the warped frame resulting in better image or video quality in the indicated areas.

23 Claims, 10 Drawing Sheets

SELECTIVE ALLOCATION OF PROCESSING RESOURCES FOR PROCESSING IMAGE DATA

TECHNICAL FIELD

The disclosure relates to image processing.

BACKGROUND

Image capture devices are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Certain image capture devices may include multiple image sensors that capture image data and transfer the image data to a camera processor. The image sensor may perform various techniques, such as pixel binning, prior to transferring pixels to the camera processor for processing. The camera processor may perform various pixel processing techniques, such as scaling at various levels of scaling, digital cropping, performing statistics algorithms, denoising, sharpening, etc. and apply various other processing resources to a frame of image data. In particular, the camera processor may perform various pixel processing techniques that achieve a desired resolution. For example, the camera processor may perform scaling of the image data using a scaling level that achieves a desired output data resolution. Scaling levels may include scaling ratios that provide upscaling, downscaling, or in some cases, no scaling, such as at the threshold between downscaling and upscaling.

SUMMARY

In general, this disclosure describes image processing techniques involving digital cameras having image sensors and camera processors. Particularly, a camera processor may be configured to pre-process a frame of image data that the camera processor receives from an image sensor. The camera processor, or in some instances, an encoder/decoder, may then non-uniformly process certain areas of the pre-processed frame using different processing resources relative to other areas of the frame.

In some examples, the pre-processing operation includes warping the frame of image data to create a frame that is warped around various indicated areas of the frame. Specifically, the camera processor may pre-process the frame of image data according to indications of particular areas of a frame received or determined by the camera processor. The indications indicate certain areas of the frame that include regions of interest, objects of interest, etc., or other distinctive areas of the frame that are to be allocated more processing resources (e.g., more pixels). For example, the camera processor may receive, via automatic detection and/or user selection, indication that a particular area of a frame includes an area of importance. The camera processor may then warp the frame around the indicated area, such that various degrees of importance of the frame may be defined by warped proportions of the warped frame.

In some examples, a camera processor may warp a frame that includes one or more indicated areas to create the warped frame in a real-time processing operation. For example, the camera processor may warp the frame in real-time as the frame of image data is received from an image sensor by using an image front end (IFE) processor. In one example, a camera processor may apply a warping grid to one or more frames of image data to create the warped frame. In any event, by pre-processing the image data by warping the frame around a user-defined or automatically detected area of a frame, such indicated areas may be allocated more area of the warped frame and more pixels of the warped frame.

In some examples, the IFE may distort a frame of image data so as to cause the frame to warp around the indicated area and thereby allocate more area of the frame to the indicated area. In such examples, warping a frame of image data around an indicated area causes the indicated area to be enlarged relative to other areas of the frame. That is, warping the frame causes the indicated area to be represented by more pixels, while other areas of the image have fewer pixels. Thus, the indicated area may be allocated more processing resources than the indicated area would be allocated in an unwarped configuration.

In this way, the camera processor may allocate more processing resources to variously indicated areas of the frame based on the pre-processing creation of the warped frame. In some examples, the warped frame may then be processed offline, output to memory, or output to an encoder/decoder for further processing. For example, an encoder/decoder or offline processor may perform processing operations that unwarp the warped frame. In an illustrative example, the encoder/decoder or offline processor may perform digital scaling of the warped frame to achieve a desired output resolution or to comply with limited processing capabilities of the camera system.

In accordance with various techniques of this disclosure, the camera processor may selectively apply various levels of scaling in amounts proportional to the amount of area of the frame allocated to the one or more indicated areas through application of the pre-processing warping operation. The warping operation is applied around indicated areas, including user-indicated areas of importance and/or automatically recognized areas of importance, such that more area of a frame is allocated the one or more indicated areas in creating a warped frame. Depending on the type of scaling used, the camera processor(s) may apply more upscaling, less downscaling, or in some instances, no scaling, with respect to pixels corresponding to the one or more indicated area(s) of a frame compared to areas of the frame adjacent the indicated area(s), such as background scenery. As such, the camera processor(s) may allocate more pixels to the one or more indicated area(s) of the frame to be utilized for post-processing operations (e.g., scaling, denoising, sharpening, etc.) relative to other areas of the frame.

Scaling is one example of a processing resource that a camera processor may apply non-uniformly to a warped frame of image data. Selective allocation of such processing resources may be advantageous for producing high quality images by reducing the amount of downscaling used to process variously indicated areas of a frame. That is, reducing the amount of downscaling performed for an indicated area may improve overall image quality because downscaling tends to degrade resulting image or video quality. In an illustrative example, the camera processor may perform upscaling or no scaling at a first scaling level on certain areas of the warped frame and may perform downscaling at a second scaling level on other adjacent areas of the frame in order to achieve a desired output resolution. In addition, camera processor may improve image quality by performing upscaling of a warped frame prior to performing other processing techniques, such as temporal super-resolution processing, sharpening, etc.

As such, a camera processor may selectively allocate processing resources (e.g., scaling, denoising, sharpening, etc.) according to proportions of a frame warped around one or more indicated areas of the frame (e.g., specific spatial regions or objects/people that may be tracked across multiple frames). In this way, an indicated area may dynamically receive higher resolution compared to the areas surrounding the indicated area because the indicated area is enlarged when the frame is warped, such that the camera processor allocates more area of the frame to the enlarged area. The output warped frame may include an area that is allocated more pixels, such that the camera processor (e.g., an image processing engine) may be enabled to allocate more time and resources to processing the indicated areas relative to other areas of the frame.

In one example, the techniques of the disclosure are directed to an apparatus configured for camera processing, the apparatus comprising: a memory configured to store image data, and one or more processors in communication with the memory, the one or more processors configured to: receive, from an image sensor, a frame of the image data; receive indication of a first area corresponding to at least a portion of the frame; warp the frame around the first area to create a warped frame; and output the warped frame for processing.

In another example, the techniques of the disclosure are directed to a method for camera processing, the method comprising: receiving, from an image sensor, a frame of image data; receiving indication of a first area corresponding to at least a portion of the frame; warping the frame around the first area; and outputting the warped frame for processing.

In another example, the techniques of the disclosure are directed to an apparatus configured for camera processing, the apparatus comprising: means for receiving a frame of image data; means for receiving indication of a first area corresponding to at least a portion of the frame; means for warping the frame around the first area to create a warped frame; and means for outputting the warped frame for processing.

In another example, the techniques of the disclosure are directed to a non-transitory computer-readable storage medium having stored thereon instructions that, when executed, cause one or more processors to: receive a frame of image data; receive indication of a first area corresponding to at least a portion of the frame; warp the frame around the first area to create a warped frame; and output the warped frame for processing.

The details of one or more examples are set forth in the accompanying drawings and the description below. Other features, objects, and advantages will be apparent from the description, drawings, and claims.

DETAILED DESCRIPTION

Figure 1:
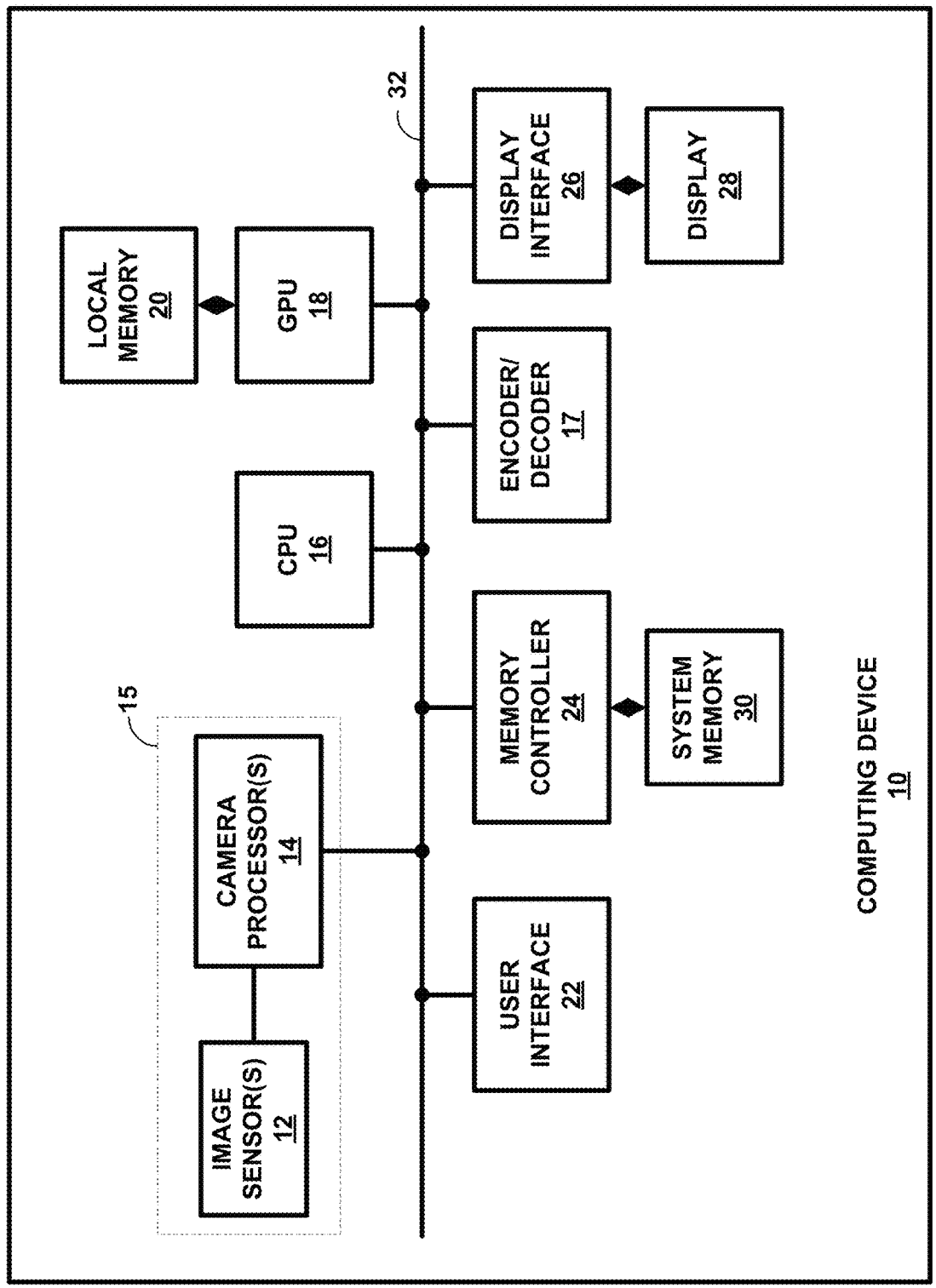
FIG. 1 is a block diagram of a device configured to perform one or more of the example techniques described in this disclosure.

A camera, including camera processor(s) and image sensors, may capture frames of image data using the one or more image sensors and output the captured frames, including pixel information defining the frame, to the camera processor(s) for processing. Among other processing techniques employed, the camera processor(s) may perform various scaling techniques under various circumstances upon receiving the image data in order to achieve a desired output resolution (e.g., a desired video output resolution) or to comply with limited processing capabilities.

In one example, a camera processor may perform upscaling using known pixel values to achieve an output resolution having more pixels than the number of pixels available from a particular image sensor. For example, a camera processor may perform upscaling to achieve a desired output resolution in the case of a relatively small image sensor to achieve video of a higher resolution, such as a 4K-capable system with a 4K image sensor (3840×2160 output pixels/frame) and an 8K desired video output (7680×4320 display pixels/frame). In another example, a camera processor may perform downscaling based on the pixel information to achieve an output resolution having fewer pixels compared to the number of pixels available from a particular image sensor.

Moreover, a camera processor may perform downscaling in cases where the camera has limited processing capabilities in terms of resolution, such as a high frame rate application (e.g., 240 frames per second (fps)) using an 8K image sensor that is fully utilized in snapshot or picture mode, but using the 8K image sensor for video at high frame rates, where the camera has video processing capabilities of 4K at 120 fps. Downscaling, however, tends to degrade the resulting image or video quality. In either case, camera processors may attempt to uniformly apply upscaling or downscaling to all pixels of an entire frame at a constant level of digital scaling regardless of any areas or regions of the frame indicated as having a higher degree of importance in the frame relative to areas adjacent such indicated areas. It may be advantageous, however, for a camera processor to process areas indicated as having a higher degree of importance differently than areas adjacent such indicated areas.

The aforementioned problems, among others, may be addressed by the disclosed techniques for providing dynamic resolution allocation by allocating more area of a frame to one or more user selected, automatically detected, or otherwise indicated areas of the frame compared to other areas of the frame adjacent the one or more indicated areas by warping a frame around the indicated areas or otherwise warping a frame that includes an indicated area of importance. In some examples, camera processor(s) may perform the warping operation by geometrically displacing various pixels in the frame. Specifically, camera processor(s) may enlarge particular areas of the frame, such that pixels in the indicated area undergo geometric displacement, whereas pixels in adjacent areas may be displaced, such that the adjacent areas decrease in size. As such, the camera processor(s) may apply scaling levels in amounts proportional to the amount of area of the frame allocated the one or more indicated areas through application of a warping grid. In any event, the warping is applied around indicated areas of the frame, including user-indicated areas of importance and/or automatically determined areas of importance, such that more area of a frame is allocated to the one or more indicated areas. In some instances, a video encoder/decoder or camera processor, such as an image processing engine, may process pixels of the warped frame, which in some instances may further result in unwarping of the warped frame.

In an illustrative example, when upscaling to achieve a higher desired output resolution (e.g., 8K video), the camera processor(s) may upscale the indicated area(s) more compared to areas adjacent the indicated area(s) due to the warped frame allocating more pixels to the indicated area(s). Selective allocation of processing resources in this context is advantageous, for example, because the camera processor(s) may then be able to perform upscaling processing of various indicated areas of a frame before the frame undergoes post-processing, such as temporal processing. This, in turn, reduces the amount of scaling used during such post-processing processes. In addition, upscaling a portion of image data before performing certain processing techniques, such as temporal super-resolution, sharpening, etc., may improve image or video quality in that portion of image data. Similarly, camera processor(s) may perform more temporal processing (e.g., temporal super-resolution), denoising, sharpening, etc. on pixels relating to the indicated areas because the indicated areas are allocated more area (e.g., more pixels) of the warped frame. That is, camera processor(s) or encoder/decoders may process the indicated areas more than other areas upon receiving the warped frame.

In some examples, selective allocation of processing resources may be achieved by using dynamic object-based lens distortion applied to a frame of image data including an area indicated by user selection or automatic detection before post-processing. The indicated area may be upscaled, or in some instances not scaled, while areas adjacent the indicated area may be downscaled. In this way, the areas adjacent the indicated area may be scaled (e.g., sampled) less densely (e.g., with fewer pixels) compared to the indicated area. In addition, the camera processor(s) workload may be maintained at an overall resolution (e.g., 1080p). Following processing via camera processor(s), areas adjacent the indicated area may be upsampled to correct for the warping operation. For example, the camera processor(s) may upscale (e.g., upsample) the areas adjacent the indicated area to match the resolution of the indicated area but using fewer pixels. As such, the disclosed technology may find advantages in the context of high frame rate processes where resolution may be limited.

As is described in detail below, the camera processor(s) may warp a frame around an indicated area to create a warped frame. The camera processor(s) may then process the warped frame of image data according to warped proportions of the warped frame, where more area of the frame is allocated to one or more indicated areas compared to an amount of area of the frame allocated the one or more indicated areas prior to application of the warping grid. In other instances, the camera processor(s) may output an unwarped frame at a desired output resolution that is scaled using an inverse distortion operation that applies an inverse warping grid to remove warping applied by the warping grid. The camera processor(s), or in some cases, a video encoder, may apply the inverse distortion operation on the warped frame to create an unwarped frame having a higher output resolution relative to the input resolution of the warping operation.

FIG. 1 is a block diagram of a computing device 10 configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras.

As illustrated in the example of FIG. 1, computing device 10 includes one or more image sensor(s) 12. Image sensor(s) 12 may be referred to in some instances herein simply as "sensor 12," while in other instances may be referred to as a plurality of "sensor(s) 12" where appropriate. In some examples, sensor(s) 12 of FIG. 1 may represent one or more image sensor(s) that may include an array of pixel sensors (e.g., "pixels"). In addition, sensor(s) 12 may include processing circuitry, memory, and/or combinations thereof. Computing device 10 further includes one or more camera processor(s) 14. In some instances, camera processor(s) 14 may comprise an image signal processor (ISP) that uses various processing algorithms under various circumstances to process image data. As shown in FIG. 1, a camera 15 may refer to a collective device including one or more image sensor(s) 12 and one or more camera processor(s) 14. Multiple cameras 15 may be included with a single computing device 10, such as a mobile phone having one or more front facing cameras and/or one or more rear facing cameras.

In accordance with various techniques of this disclosure, camera processor(s) 14 may receive one or more frames of image data from sensor(s) 12. That is, camera processor(s) 14 are configured to receive image frames (e.g., pixel data) from sensor(s) 12, and process the image frames to generate image and/or video content. For example, sensor(s) 12 may be configured to capture individual frames, frame bursts, frame sequences for generating video content, photo stills captured while recording video, image previews, or motion photos from before and/or after capture of a still photograph. CPU 16, GPU 18, camera processor(s) 14, or some other circuitry may be configured to process the image and/or video content captured by sensor(s) 12 into images or video for display on display 28. In the context of this disclosure, image frames may generally refer to frames of data for a still image or frames of video data or combinations thereof, such as with motion photos. Camera processor(s) 14 may receive from sensor(s) 12 pixel data of the image frames in any format. For example, the pixel data may include different color formats, such as RGB, YCbCr, YUV, etc.

While some example techniques are described herein with respect to a single sensor 12, the example techniques are not so limited, and may be applicable to various camera types used for capturing images/videos, including devices that include multiple image sensors, multiple lens types, and/or multiple camera processors. For example, computing device 10 may include dual lens devices, triple lens devices, etc. In some examples, one image sensor 12 may be allocated for each lens. That is, multiple image sensors 12 may be each allocated to different lens types (e.g., wide lens, ultra-wide lens, telephoto lens, and/or periscope lens, etc.). In some examples, a single image sensor 12 may correspond to multiple lenses.

In some examples, a single one of camera processor(s) 14 may be allocated to one or more sensors 12. In some instances, however, multiple camera processors 14, such as multiple image front ends (IFEs) or multiple image processing engines (IPEs), may be allocated to one or more sensor(s) 12. In general, an IFE performs real-time processing of image data received from image sensor(s) 12. An IFE also provides an interface between image sensor(s) 12 and one or more IPEs. For example, the IFE may pre-process image data, such as by warping a frame of image data around an area of importance as discussed in this disclosure, and output the warped frame to the IPE. Generally speaking, an IPE performs various offline processing techniques, including denoising, spatial denoising, temporal denoising, edge enhancement, sharpening, scaling (e.g., upscaling, downscaling), color correction, etc.

In examples including multiple camera processor(s) 14, camera processor(s) 14 may share sensor(s) 12, where each of camera processor(s) 14 may interface with each of sensor(s) 12. In any event, camera processor(s) 14 may initiate capture of a video or image of a scene using a plurality of pixel sensors of sensor(s) 12. In some examples, a video may include a sequence of individual frames. As such, camera processor(s) 14 causes sensor(s) 12 to capture the image using the plurality of pixel sensors. Sensor(s) 12 may then output pixel information to camera processor(s) 14 (e.g., pixel values, luma values, color values, charge values, Analog-to-Digital Units (ADU) values, etc.), the pixel information representing the captured image or sequence of captured images. In some examples, camera processor(s) 14 may process monochrome and/or color images to obtain an enhanced color image of a scene.

As illustrated, computing device 10 may further include a central processing unit (CPU) 16, an encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28 (e.g., a display device).

CPU 16 may comprise a general-purpose or a special-purpose processor that controls operation of computing device 10. A user may provide input to computing device 10, for example, to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of camera 15. The user may provide input to computing device 10 via one or more input devices (not shown) such as a keyboard, a mouse, a microphone, a touch pad or another input device that is coupled to computing device 10 via user interface 22. For example, user interface 22 may receive input from the user to select a particular area (e.g., an area of importance) of a frame, adjust a desired digital zoom levels, alter aspect ratios of image data, record video, take a snapshot while recording video, apply filters to the image capture, record slow motion video or super slow motion video, apply night shot settings, capture panoramic image data, etc.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processor(s) 14 to process the images captured by sensor(s) 12 in the user-defined manner. For example, CPU 16 may receive via user interface 22 indication of a user-selected area of a frame (e.g., a face).

In some examples, CPU 16 may receive user input with respect to an area of a frame indicating an area of importance. The user input may include tap, gaze, gesture, and/or voice inputs. For example, CPU 16 may track a gaze of a user to identify particular areas of a frame that include a face (e.g., face detection, facial recognition applications, etc.). CPU 16 may then track the face, indicated by the user input, across multiple frames. As such, the indicated area of importance may be an object-of-interest, a region-of-interest, etc. In another example, the area of importance may include a person, or at least a portion of a person, selected in a picture or video frame (e.g., user tap, user voice input). In another example, the area of importance may include a region of a frame, such as a center quarter of the frame, top-right region of the frame, etc. Example gesture inputs may include pinch-to-zoom commands, screen swipes, detected hand gesture commands, etc. In some examples, the indicated area may include an automatically detected hand, head, face, or other body gesture, such as in the case of hand gesture recognition or other forms of gesture recognition. The gesture may then be tracked so as to provide user input or additional user input. An example voice input may include a user verbalizing a particular object or region in a frame that the user would like CPU 16 or camera processor(s) 14 to identify and/or track. In any event, the indicated area may include any area of a frame that a user desires to capture with more resolution than another area of the frame. CPU 16 may execute tracking of the indicated area from a first frame to a subsequent frame. In some examples, camera processor(s) 14 may perform detecting and/or tracking of the one or more indicated areas. For example, camera processor(s) 14 may use machine learning (ML) and/or artificial intelligence (AI) algorithms to detect and/or track variously indicated areas of a frame. In some examples, the user input may be received via user interface 22, where CPU 16 and/or camera processor(s) 14 may then perform area identification and/or tracking of areas (e.g., areas of importance) of a frame of image data variously indicated via user interface 22.

In some examples, CPU 16 may deploy, as part of a software application, ML models and/or AI algorithms to detect areas of importance of a frame. CPU 16 may indicate the detected areas or portions of the areas of importance (e.g., portions of a face), to camera processor 14 that the frame of image data should be warped so as to allocate more area of the frame (e.g., more pixels) to the indicated area. In some instances, CPU 16 may deploy such algorithms or models in conjunction with user input. In some examples, CPU 16 may deploy such algorithms or models independent of user input. As such, the ML models and/or AI algorithms may execute on CPU 16. In another example, the ML models and/or AI algorithms may execute on GPU 18. In another example, certain ML models and/or AI algorithms tasked with indicating areas of a frame for processing may execute on hardware accelerators dedicated for ML/AI tasks. For example, a DSP may execute certain ML models and/or AI algorithms configured to indicate particular areas of a frame. In some examples, an object detection network, such as a deep learning-based detector, may be used to detect or classify object in frames of image data. For example, object detection architecture (e.g., you-only-look-once (YOLO), single shot detector (SSD), convolutional neural network (CNNs), etc.) may be used to indicate locations of certain areas (e.g., locations of faces) in a frame. In another example, CPU 16 may utilize a network-based face detection to indicate various areas or regions of a frame as containing areas of importance.

In some examples, an AI algorithm may be configured to automatically recognize or detect particular areas in a frame. As such, an AI algorithm and/or a ML model may automatically detect an area of a frame and track the area in the frame or over a sequence of frames, such as a preview frame prior to capturing a photo, a sequence of frames for video, etc., regardless of whether user input has been received. In some examples, CPU 16 may use AI algorithms and/or ML models to detect an area of importance after receiving user input. For example, a user may touch part of a display of the captured image that corresponds to a particular object, in which case an AI algorithm may detect the particular object in the frame so as to indicate that the full object comprises an area of importance. In some examples, an AI algorithm may automatically detect an area of importance. In addition, the AI algorithm may detect a user-selected area of importance, such as the face of a person or hand gesture of a person (e.g., for facial and human gesture recognition applications). The AI algorithm may also detect other user input, such as a gaze, gesture (e.g., hand gesture), voice, or tap input. In some examples, camera processor(s) 14 may perform detecting and/or tracking of such variously indicated areas. For example, camera processor(s) 14 may detect and/or track areas indicated within a frame using an AI algorithm or ML model to automatically detect an area of importance and in addition, detect a user-selected area of importance.

In accordance with various techniques of this disclosure, camera processor(s) 14 may receive an indication of an area of importance corresponding to at least a portion of a frame received from sensor(s) 12. Camera processor(s) 14 may receive an indication of the area from CPU 16 or in some instances, camera processor(s) 14 may receive the indication of the area with or without user input as a result of a process implemented by camera processor(s) 14.

Camera processor(s) 14 may warp the frame around an indicated area of importance to create a warped frame having the indicated area enlarged in the warped frame. In some examples, camera processor(s) 14 may apply a warping grid around the indicated area to create the warped frame. That is, a warping operation may be performed that warps a frame relative to the location of the indicated area in the frame, such that the indicated area appears enlarged, whereas other areas adjacent the indicated area would appear shrunken in size. In an example, camera processor(s) 14 may enlarge an area of importance to have more pixels and shrink areas adjacent the indicated area to include fewer pixels in order to create the warped frame, such that the total area of the frame remains the same before and after the warping operation is complete.

Camera processor(s) 14 may then output the warped frame for processing. In some instances, applying the warping grid to create the warped frame includes applying the warping grid to the entire frame including around the indicated area(s) of importance. For example, applying the warping grid to create the warped frame includes applying the warping grid to the frame including to the indicated area of importance and at least one area of the frame adjacent the indicated area. In this way, application of the warping grid may result in more area of the warped frame (e.g., more pixels) being allocated to the indicated area relative to an amount of area of the warped frame allocated to at least one area of the frame adjacent the indicated area of importance.

Camera processor(s) 14 may output the warped frame for further processing. For example, as described with reference to FIGS. 2 and 3, camera processor(s) 14 may output the warped frame for scaling operations to achieve a desired output resolution. In addition, camera processor(s) 14, such as IPE 42A and/or IPE 42B, may perform additional processing operations to the warped frame in accordance with the warping of the frame. For example, camera processor(s) 14, IPE 42A and/or IPE 42B, may perform spatial denoising, temporal denoising, edge enhancement, sharpening, scaling (e.g., upscaling, downscaling), color correction, etc.

In some examples, scaling operations may be performed by encoder/decoder 17, or by other processors of camera processor(s) 14, such as by one or more IPEs. In some examples, camera processor(s) 14 may output the warped frame to system memory 30. In another example, camera processor(s) 14 or encoder/decoder 17 may perform various scaling operations to unwarp the warped frame and as such, store the unwarped frame to system memory 30. In some examples, unwarping of the frame involves an inverse distortion operation. In any event, camera processor(s) 14 or encoder/decoder 17 may unwarp a frame warped around an indicated area by causing the previously enlarged area to return to an original size of the area of importance relative to other areas of the frame as in the original unwarped frame received from image sensor(s) 12. In such examples, camera processor(s) 14 may upscale areas adjacent the previously indicated areas at various scaling levels, while the indicated area may undergo scaling at different levels (e.g., a non-scaling level, etc.), to achieve the unwarping operation. The scaling levels may be proportional to the amount of pixels allocated various areas of the frame during the original warping operation. For example, the indicated areas may receive more pixels as a result of a geometric displacement of pixels during the frame warping operation. Camera processor(s) 14 or encoder/decoder 17 may perform unwarping after or during offline processing.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor(s) 14, CPU 16, and GPU 18. For example, system memory 30 may store user applications (e.g., instructions for the camera application), resulting images or frames from camera processor(s) 14 and/or encoder/decoders 17, etc. System memory 30 may additionally store information for use by and/or generated by other components of computing device 10. For example, system memory 30 may act as a device memory for camera processor(s) 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor(s) 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor(s) 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor(s) 14, CPU 16, and GPU 18 may store image data, and the like, in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

In addition, camera processor(s) 14 may be configured to analyze pixel data and/or output the resulting images (e.g., pixel values for each of the image pixels) to system memory 30 via memory controller 24. Each of the images may be further processed for generating a final image for display. For example, GPU 18 or some other processing unit, including camera processor(s) 14, may perform color correction, white balance, blending, compositing, rotation, or other operations to generate the final image content for display.

Display 28 may include a monitor, a television, a projection device, a liquid crystal display (LCD), a plasma display panel, a light emitting diode (LED) array, an organic LED (OLED), a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link.

Also, although the various components are illustrated as separate components, in some examples the components may be combined to form a system on chip (SoC). As an example, camera processor(s) 14, CPU 16, GPU 18, and display interface 26 may be formed on a common integrated circuit (IC) chip. In some examples, one or more of camera processor(s) 14, CPU 16, GPU 18, and display interface 26 may be in separate IC chips. Various other permutations and combinations are possible, and the techniques of this disclosure should not be considered limited to the example illustrated in FIG. 1.

The various components illustrated in FIG. 1 (whether formed on one device or different devices), including sensor(s) 12 and camera processor(s) 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Figure 2:
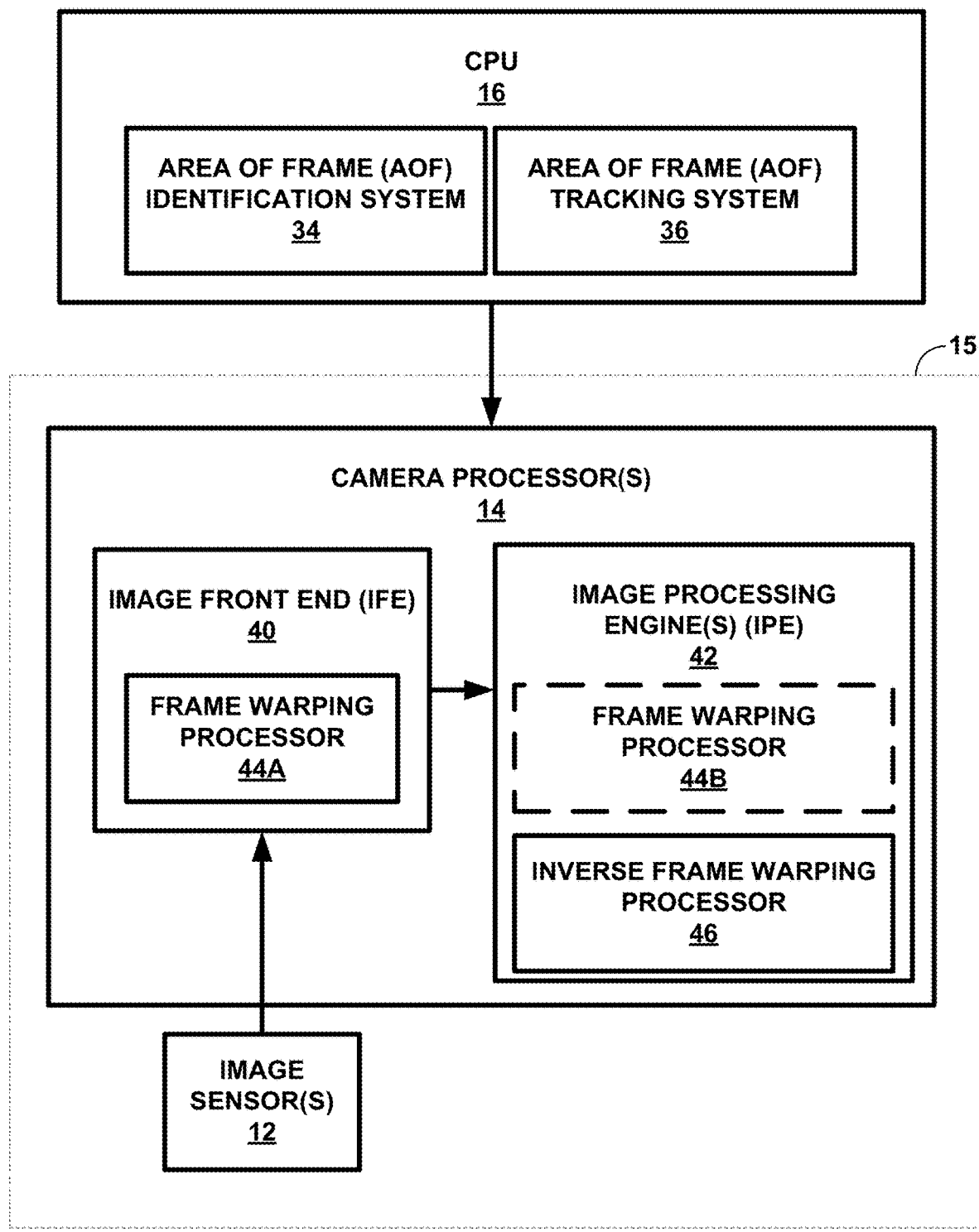
FIG. 2 is a block diagram illustrating example components of a camera including camera processor(s) of FIG. 1, in accordance with various aspects of the techniques described in this disclosure.

FIG. 2 is a block diagram illustrating example components of camera 15 including camera processor(s) 14 of FIG.

1. In some examples, camera processor(s) 14 may include an IFE 40. In some examples, IFE 40 interfaces between image sensor(s) 12 and one or more IPEs 42. IPEs 42 perform offline processing of image data as described below. In some examples, one of IPEs 42 may perform real-time processing of image data. That is, IPEs 42 may be configured to perform one or more of the processing techniques offline, rather than in real-time as the image data is received from sensor(s) 12. In some examples, one or more IPEs 42 may be configured to perform techniques such as, spatial processing, temporal processing, sharpening, denoising, etc. In addition, camera processor(s) 14 may be configured to perform various operations on image data captured by sensor(s) 12, including auto white balance, color correction, or other post-processing operations. In some examples, a processing "engine" may refer to hardware that can be used to process data. Example hardware may include fixed-function or programmable processing engines in camera processor(s) 14, GPU 18, CPU 16, a DSP, or any other processing circuitry available on computing device 10.

In some examples, CPU 16 may include an area identification system 34 that identifies one or more areas of a frame (AOFs), such as regions-of-interest (ROIs), areas of importance, objects of importance, etc., found within a particular frame of image data (hereinafter, AOF identification system 34). AOF system 34 may identify the one or more AOFs with or without user input. In some examples, AOF identification system 34 may identify an AOF based on user input that includes one or more of a tap, gaze, gesture, voice, etc. In an illustrative example, AOF identification system 34 may track the gaze of a user. In another example, AOF identification system 34 may receive a touch input, such as a tap, indicating the location of a face for identifying and/or tracking in a frame of image data. It should be noted that while certain examples of user input, such as touch or tap input, may be described in this disclosure, the techniques of this disclosure are not so limited, and other examples of user input may be used to indicate areas of a frame for identification and/or tracking. In some examples, AOF identification system 34 may identify the AOF using AI algorithms and/or ML models. In addition, AOF identification system 34 may perform automatic detection of one or more AOFs as an alternative to user input or to supplement the user input.

Similarly, CPU 16 may include an AOF tracking system 36 that tracks an AOF, or portions of an AOF from one frame to a subsequent frame. AOF identification system 34 or AOF tracking system 36 may utilize various ML models or AI algorithms to identify an AOF and/or track the AOF across multiple frames. In some examples, either AOF identification system 34 or AOF tracking system 36 may perform image segmentation. In a non-limiting example, AOF identification system 34 or AOF tracking system 36 may perform image segmentation based on color. For example, AOF identification system 34 or AOF tracking system 36 may perform image segmentation based on the color(s) in a region of a frame selected by a user. In some examples, AOF identification system 34 or AOF tracking system 36 may identify an area of a frame and/or track the area of the frame using various feature detection and/or optical flow techniques.

IFE 40 may also include a frame warping processor 44A configured to warp a frame of image data received from image sensor(s) 12. In some examples, frame warping processor 44A may apply virtual lens distortion or a warping grid to one or more frames. Frame warping processor 44A may receive from CPU 16 an indication of an area of the frame, such as selected or detected area of importance. For example, the indication of an area of importance may include size, shape, and/or frame location information. In one example, the area may indicate an area of the frame where an object of importance is located, the size of the object, and the shape of the object, such that frame warping processor 44A may warp the frame around the area of importance based on the information received from CPU 16.

In some examples, IFE 40 may warp a frame of image data via frame warping processor 44A. For example, IFE 40 may warp the frame around an area of the frame indicated as including an area of importance. In some examples, IFE 40 may warp the frame around an area of importance as the frame of image data is received from image sensor(s) 12. In a non-limiting example, IFE 40 may apply a warping grid to a frame as the frame of image data is received from image sensor(s) 12. As such, the IFE 40 may create a warped frame that allocates different size areas of the warped frame to variously indicated areas compared to areas adjacent the indicated areas. IFE 40 may warp the frame around the indicated area while maintaining a constant number of pixels for the frame. As such, warping the frame allocates more pixels to the indicated area in the warped frame while allocating fewer pixels to areas of the frame adjacent to the indicated area. However, the warped frame may have the same number of pixels as the frame received from image sensor(s) 12. In some examples, one or more of IPEs 42 may include a frame warping processor, such as frame warping processor 44B. The IPE 42 may include frame warping processor 44B in addition to or in lieu of IFE 40 including frame warping processor 44A. In such instances, IPE 42 may receive a frame of image data from IFE 40 and may apply a warping operation to the frame using frame warping processor 44B. After warping, IPE(s) 42 may apply various processing operations to the warped frame, while in some examples, IPE(s) 42 may apply such operations non-uniformly to the warped frame based on the particular warping configuration of the output warped frame.

In some examples, after warping, IPE(s) 42 may apply various processing resources to the frame, such as spatial denoising, temporal denoising, temporal and/or spatial super-resolution, tone mapping, warping (e.g., geometrical warping), edge enhancement, sharpening, scaling (e.g., upscaling, downscaling), color correction, etc. In one example, after warping, IPE(s) 42 may perform scaling of the warped frame using different scaling levels with respect to pixels corresponding to the indicated AOFs (e.g., areas of importance, etc.) compared to areas adjacent the indicated areas. In another example, IPE(s) 42 may perform temporal denoising by combining frames of video data. While some examples of this disclosure include the example of scaling using different scaling levels across a warped frame, the techniques of this disclosure are not so limited, and it will be understood that IPE(s) 42 or encoder/decoder 17 may allocate more processing resources, such as those described above, to indicated AOFs relative to other areas in a frame adjacent the indicated AOFs.

In an illustrative example, after warping, IPE(s) 42 may perform scaling of the warped frame using different scaling levels. As such, IPE(s) 42 or encoder/decoder 17 may allocate different scaling levels to indicated areas (e.g., areas of importance) relative to other areas in a frame, such that the indicated areas receive enhanced resolution. In any event, by allocating an indicated area of importance more pixels, IPE(s) 42 or encoder/decoder 17 may allocate more time and resources on the indicated area in the warped frame relative to the indicated area in an unwarped frame of the image data.

In some examples, IPE(s) 42 may include an inverse frame warping processor 46 that is configured to unwarp a warped frame of image data. As discussed with reference to FIG. 3, inverse frame warping processor 46 may perform unwarping after or during offline processing. In another example, encoder/decoder 17 may perform the unwarping as encoder/decoder 17 receives data from camera processor(s) 14.

In this way, better processing, quality, resolution, etc. is achieved for indicated areas (e.g., areas of importance) relative to areas adjacent the indicated areas. In addition, in implementations allowing high processing capabilities, selectively allocating processing resources based on parameters of a warped frame may also reduce power consumption of computing device 10. That is, camera processor(s) 14 may not apply processing resources equally to important and non-important areas of the warped frame, although the device may be configured to perform such high resolution processing. In this way, camera processor(s) 14 may increase efficiency and conserve energy that may otherwise be wasted for resource-intensive processing of non-important areas of a frame.

Figure 3:
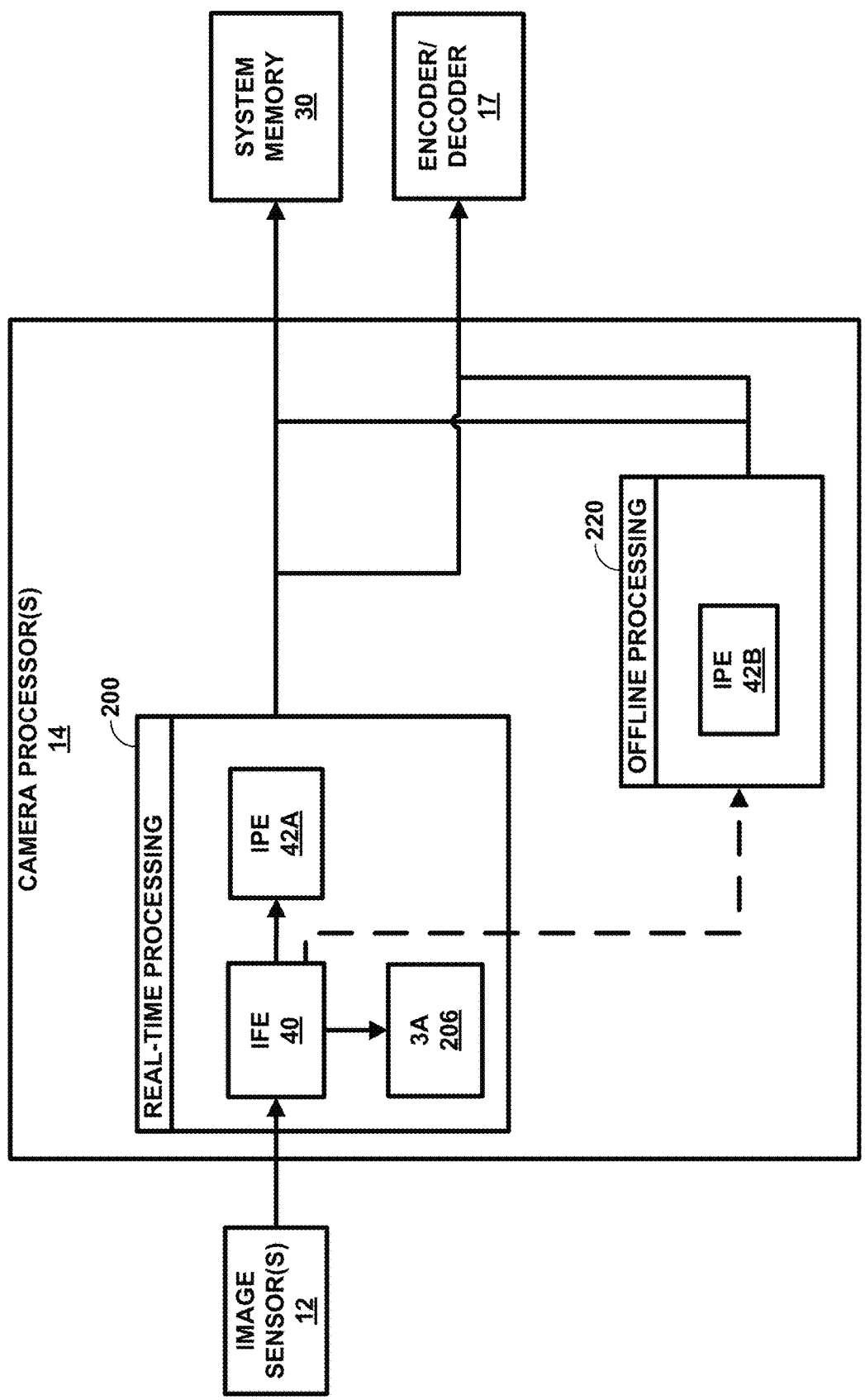
FIG. 3 is a conceptual diagram illustrating example real-time processing and offline processing of the camera processor(s) shown in FIG. 1 or 2, in accordance with various aspects of the techniques described in this disclosure.

FIG. 3 is a conceptual diagram illustrating example real-time processing and offline processing of camera processor(s) 14. Real-time processing 200 may be a type of live stream. A live stream refers to any configuration in which the processing engines receive data from image sensor(s) 12, but do not modify data from previous requests (e.g., data previously stored in memory). Offline processing 220 may be a type of offline stream. An offline stream is any configuration in which the processing engines do not receive data from an image sensor, but rather access image data from a memory or from another processing engine.

3A 206 represents the functionality of a statistics algorithm processing engine of camera processor(s) 14. The 3A algorithms may include autofocus (AF), auto exposure control (AEC), and auto white balance (AWB). 3A 206 may be configured to perform one or more of AF, AEC, and/or AWB processing to control the function of image sensor(s) 12. IPEs 42A-42B (collectively, IPEs 42) represent image processing engines internal to camera processor(s) 14. IPEs 42A may be configured to handle various real-time image processing techniques (e.g., image processing that occurs at the same speed as image sensor(s) 12 throughput rate). In some examples, IPEs 42 may be configured to perform processing techniques for video and image preview, such as 3A processing via 3A 206. System memory 30 represents memory (e.g., frame buffers of system memory 30) used for displaying image data for camera and camcorder (video) application. Camera processor(s) 14 may perform 3A algorithms based on the warped frame outputted from IFE 40.

Offline processing 220 is configured to process image data, after processing by IFE 40. In this way, offline processing 220 may be considered a post-processing. Unlike real-time processing 200, offline processing 220 does not access image data directly from camera module 12 (e.g., sensor(s) 12), but rather accesses data from IFE 40, either directly or through an output buffer of IFE 40. In addition, offline processing 220 may include image processing that does not need to occur at the same speed as image sensor(s) 12 throughput rate. Offline processing 220 may include IPE 42B. System memory 30 may represent the memory to which the processed image data is to be stored. System memory 30 may further represent the memory to which the pre-processed image data is to be stored (e.g., a warped frame). In such examples, system memory 30 may perform unwarping and scaling operations of the warped frame or may output the warped frame to another device for further processing.

In an illustrative example, IFE 40 may receive one or more frames of image data from image sensor(s) 12, the one or more frames including at least one area of importance. The area of importance information may be received from CPU 16, such as from AOF identification system 34. In some examples, AOF identification system 34 may indicate to CPU 16 an AOF that constitutes an area of the frame selected by a user and/or automatically detected. For example, IFE 40 may receive one or more frames of image data from image sensor(s) 12 with image segmentation information regarding the location, size, and shape of an area indicated in at least one frame of the image data.

IFE 40 may provide at least one frame of the image data to IPE 42A or IPE 42B. As such, IPE 42A or IPE 42B may warp a frame of image data around the indicated area of importance to create the warped frame. For example, IPEs 42 may warp the frame of image data in real-time as IPEs 42 read input from IFE 40 or offline as part of an offline processing pipeline 220. In some examples, IFE 40 may apply the warping grid around the area of importance to create the warped frame. For example, IPEs 42 may apply a warping grid in real-time as IPEs 42 read input from IFE 40 or offline as part of an offline processing pipeline 220. In any event, IPE 42A or IPE 42B may output the warped frame to system memory 30 or encoder/decoder 17.

In some examples, IPEs 42A or 42B may perform scaling of the warped frame to achieve an unwarped frame at a desired output resolution. In some examples, IPEs 42A or 42B may perform scaling prior to outputting the frame of image data to system memory 30 or encoder/decoder 17. In some examples, encoder/decoder 17 may perform an inverse distortion operation that applies inverse warping to remove warping of the warped frame. For example, encoder/decoder 17 may perform an inverse distortion operation that applies an inverse warping to remove warping of the warped frame. For example, encoder/decoder 17 may perform an inverse distortion operation that applies an inverse warping grid to remove warping applied by a warping grid. Encoder/decoder 17 may perform the inverse distortion operation in real-time as encoder/decoder 17 reads input from IPEs 42A or 42B. In some examples, encoder/decoder 17 may perform the inverse distortion operation as encoder/decoder 17 reads input from system memory 30. For example, encoder/decoder 17 may access a warped frame of image data from system memory 30. In any event, camera processor(s) 14 may output the frame of image data at the desired output resolution to one or more of encoder/decoder 17 or a memory device (e.g., DRAM). For example, camera processor(s) 14 may output the frame of image data at the desired output resolution after performing a scaling operation.

In an illustrative example, image sensor(s) 12 may capture a frame of image data and output the frame of image data to IFE 40. In some examples, IFE 40 or IPE 42 may apply a warping operation to the frame of image data to create a warped frame of the image data. IFE 40 or IPE 42 may output the warped frame. For example, IFE 40 may output the warped frame to IPE 42A or IPE 42B or in some instances, to another component of computing device 10, such as a node for 3A processing 206, system memory 30, encoder/decoder 17, etc. In another example, IPEs 42A or 42B may output the warped frame to another one of IPE 42.

In an illustrative example, IFE 40 may first output a warped frame to IPE 42A, at which point IPE 42A may output the warped frame to IPE 42B. In some examples, IFE 40, IPE 42A, IPE 42B may create the warped frame and output the warped frame for further processing, such as scaling and inverse distortion operations.

Figure 4:
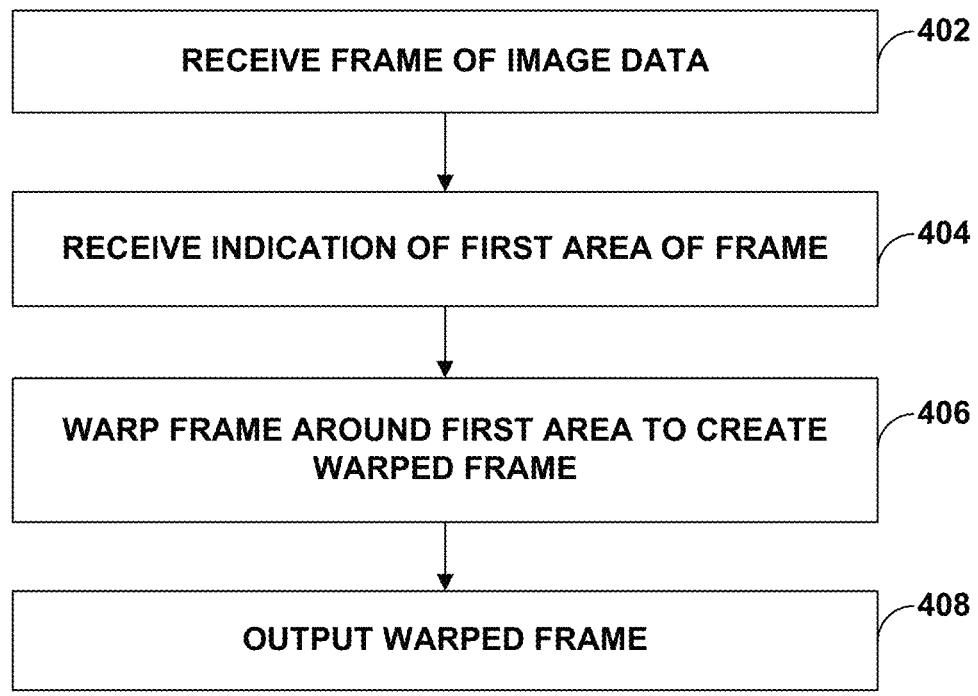
FIG. 4 is an example flowchart illustrating an example method and technique of camera processor(s) shown in FIG. 1, 2, or 3, in accordance with various aspects of the techniques described in this disclosure.

FIG. 4 is an example flow diagram illustrating example operations of camera processor(s) 14, image sensor(s) 12, encoder/decoder 17, and/or system memory 30, shown in FIG. 1, performing warping operations to create and/or output a warped frame of image data. Camera processor(s) 14 may receive a frame of image data from image sensor(s) 12 (402). In some examples, receiving the frame of image data may comprise IFE 40 receiving the frame of image data from image sensor(s) 12.

In addition, camera processor(s) 14 may receive indication of a first area (e.g., an area of importance) of a frame (404). As described above, camera processor(s) 14 may receive the indication via one or more of a user selection or an automatic detection. The indicated first area may comprise at least one of an object-of-interest, such as a face, or a region-of-interest, such as a particular region that a user indicates as being important in the frame. In a non-limiting example, an area of importance may represent a portion of a face of a person or a full face of a person that, in the case of video, may be tracked from one frame to a subsequent frame. In another non-limiting example, the indicated area may represent one or more objects that move during the filming or photo capture of an activity. In some instances, the higher resolution area from a warped frame may be used to assist in the tracking of the area in a subsequent frame. For example, camera processor(s) 14 and/or CPU 16 may use the higher pixel areas to determine to what location of the frame a moving object may be tracked in a subsequent frame of the image data.

In addition, camera processor(s) 14 may warp the frame around the indicated first area to create a warped frame (406). In one example, camera processor(s) 14 may allocate more pixels to the indicated area and allocate fewer pixels to areas adjacent the indicated area in creating the warped frame. For example, camera processor(s) 14 may use the indication of the indicated area to determine areas of the frame that should be processed with more processing resources, such as pixel allocation, processing time, etc. In one example, camera processor(s) 14 may apply a warping grid around the indicated area. An example visual representation of allocating processing resources non-uniformly across a frame based on variously indicated areas is described with reference to FIG. 8. For example, camera processor(s) 14 may apply a frame distortion technique that creates the warped frame, such as a virtual lens distortion that bends, stretches, or shrinks an image to conform to a distorted virtual lens. The distorted virtual lens may dynamically distort images depending on sizes, shapes, and/or locations of areas indicated and/or tracked in a frame of image data. In any event, camera processor(s) 14 may allocate different amount of pixels to different regions or areas of a frame.

In some examples, camera processor(s) 14 may apply a warping grid around the indicated area to create the warped frame. For example, camera processor(s) 14 may apply the warping grid to the frame including the indicated area and at least one area of the frame adjacent the indicated area. In one example, camera processor(s) 14 may apply the warping grid to the frame including to the indicated area, such as an indicated area of importance, and to at least one area of the frame adjacent the indicated area. In such examples, application of the warping grid results in more area of the warped frame being allocated to the indicated area relative to an amount of area of the warped frame allocated to at least one area of the frame adjacent the indicated area.

In some examples, camera processor(s) 14 may output the warped frame (408). For example, camera processor(s) 14 may output the warped frame to an encoder/decoder 17, display interface 26 (e.g., for ultimate display via display 28), or system memory 30 (e.g., DRAM). In some examples, camera processor(s) 14 may output the warped frame from IFE 40 to IPE 42A or to IPE 42B. In another example, IPE 42A or IPE 42B may output the warped frame to another one of IPEs 42 (e.g., IPE 42A output to IPE 42B). In one example, one of IPE(s) 42 may output the warped frame to system memory 30 for subsequent access by the same one of IPE(s) 42. For example, one of IPE(s) 42 may perform the frame warping operation via frame warping processor 44B and the inverse frame warping and scaling operation via inverse frame warping processor 46, where the frame warping processor 44B may output the warped frame first to system memory 30 or directly to inverse frame warping processor 46. In another example, IFE 40 or one of IPEs 42 may output the warped frame to another component or logical node of computing device 10, such as 3A node 206, for further processing. In some examples, camera processor(s) 14 may output the warped frame to GPU 18, where GPU 18 may perform an inverse warping operation and/or a scaling operation (e.g., via an inverse warping frame processor) while reading the input of the warped frame or GPU 18 may store the warped frame to local memory 20 for subsequent access and processing. In the interest of brevity, not all possible warped frame output outcomes may be listed, but it will be understood that more output outcomes are possible for the warped frame using camera processor(s) 14 in the context of computing device 10.

Figure 5:
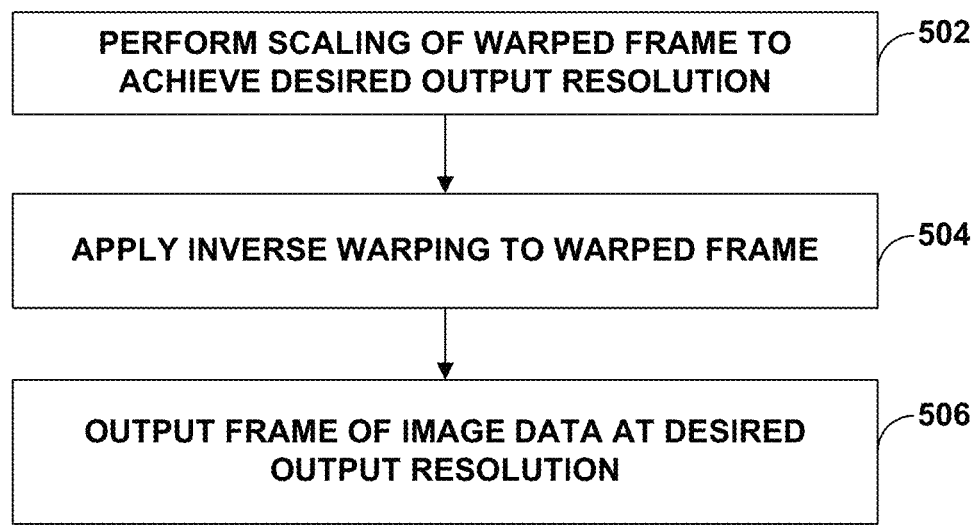
FIG. 5 is an example flowchart illustrating an example method for applying inverse warping to a warped frame, in accordance with various aspects of the techniques described in this disclosure.

FIG. 5 is an example flow diagram illustrating example operations of camera processor(s) 14, encoder/decoder 17, and/or system memory 30, shown in FIG. 1, performing inverse warping operations using warped frames of image data. Encoder/decoder 17 or various components of camera processor(s) 14, such as IPE 42B or IPE 42A, may receive a warped frame of image data from a component applying a warping grid or other warping technique to the frame of image data. For example, IFE 40 may apply the warping to create the warped frame and output the warped frame to IPE 42A, 42B, or encoder/decoder 17. In another example, one of IPEs 42 may apply the warping to create the warped frame and output the warped frame to encoder/decoder 17.

As such, camera processor(s) 14, CPU 16, GPU 18, display interface 26, or encoder/decoder 17 may perform scaling of the warped frame to achieve a desired output resolution (502). In some examples, the scaling may include downscaling, upscaling, no scaling, and combinations thereof, in accordance with various techniques of this disclosure. That is, the scaling at various levels (e.g., downscaling ratios, upscaling ratios) may not be performed uniformly to the entire warped frame. In some examples, camera processor(s) 14, CPU 16, GPU 18, display interface 26, or encoder/decoder 17 may perform scaling in accordance with relative pixel amounts that are allocated to various areas of the frame as a result of the warping operation. In one illustrative example, camera processor(s) 14 may warp a frame of image data to create a warped frame that allocates more area of the frame to indicated areas, including area(s) of importance, whereas areas of the frame adjacent the indicated areas may be allocated less area of the frame (e.g., fewer pixels) as a result of the warping operation. In such instances, camera processor(s) 14, CPU 16, GPU 18, display interface 26, or encoder/decoder 17 may perform scaling of the warped frame using non-uniform scaling levels that vary according to size, shape, and/or location information of the indicated area(s) of the warped frame. As an example, camera processor(s) 14, CPU 16, GPU 18, display interface 26, or encoder/decoder 17 may perform scaling and inverse warping operations while receiving and reading in the warped frame as input.

In some examples, camera processor(s) 14 or encoder/decoder 17 may perform an inverse warping operation by applying inverse warping to the warped frame (504). Camera processor(s) 14 or encoder/decoder 17 may apply inverse warping to the warped frame to remove warping from the warped frame. In one example, camera processor(s) 14 or encoder/decoder 17 may apply an inverse warping operation to the warped frame to remove warping from the warped frame. For example, camera processor(s) 14 or encoder/decoder 17 may apply an inverse warping grid that causes the indicated area to return to original proportions of the original frame as a result of the scaling operation. It should be noted that the image of the indicated area may appear larger in some examples due to certain scaling operations being illustrated in this disclosure as increasing or decreasing the size of the frame (e.g., FIGS. 9 and 10).

In some examples, IPE 42A, IPE 42B, or encoder/decoder 17 may perform scaling of the warped frame to achieve a desired output resolution by performing an inverse distortion operation. The inverse distortion may include an inverse warping operation to remove warping of the warped frame. The inversely warped frame may resemble a starting frame prior to warping, except the inversely warped frame may not be of the same size due to the scaling (e.g., more or fewer total pixels). For example, to achieve a higher desired output resolution, camera processor(s) 14 or encoder/decoder 17 may perform scaling to the indicated area(s) at a higher upscaling level or a non-scaling level, relative to areas adjacent the indicated area(s) based on the amount of area of the warped frame allocated the indicated area(s) of the warped frame.

To achieve a lower desired output resolution or to comply with limited processing capabilities, camera processor(s) 14 or encoder/decoder 17 may perform scaling to the indicated areas at a lower downscaling level, such as a non-scaling level, relative to areas adjacent the indicated areas based on the amount of area of the warped frame allocated the indicated areas. In some instances, camera processor(s) 14 or encoder/decoder 17 may perform upscaling or no scaling for some areas of the frame (e.g., variously indicated areas of the frame) and downscaling for other areas of the frame (e.g., non-indicated areas of the frame). In doing so, camera processor(s) 14 or encoder/decoder 17 may remove the warping applied by the warping grid and achieve an output frame that is not warped.

It should also be noted that while inverse warping is described separately from scaling, the techniques of this disclosure are not so limited, and it should be understood that scaling and inverse warping may be performed in a single operation. For example, camera processor(s) 14 may perform a single operation of inverse warping with scaling of the warped frame to achieve a desired output resolution. The camera processor(s) 14 may perform such operations based at least in part on an identity map. In another example, camera processor(s) 14 may perform a single operation of warping and scaling of the warped frame to achieve an output resolution that complies with processing limitations that camera processor(s) 14, encoder/decoder 17, system memory 30, or display 28 may have. That is, camera processor(s) 14 may perform inverse warping with scaling of the frame to achieve a smaller frame size, as described with reference to FIG. 10 as one illustrative and non-limiting example. In such examples of processing limitations, the smaller frame size may have a lower output resolution for the frame as a whole, but where the indicated areas have a higher resolution relative to other areas of the frame (e.g., the adjacent areas of the frame). Similarly, in examples having a higher resolution output, the total frame may have a higher resolution (e.g., more pixels) compared to the frame received from image sensor(s) 12, with the indicated area having a higher resolution relative to other areas of the frame (e.g., the adjacent areas of the frame). For example, the indicated area may have the same or a higher resolution compared to that of the total frame resolution, whereas adjacent areas may have lower resolution compared to that of the total frame resolution. In some instances, the difference in resolution may not be noticed by the human eye, such as where more pixels are allocated to an indicated face of a person and where fewer pixels are allocated to less important background scenery. This is because the human eye is more likely to focus on the variously indicated areas (e.g., areas of importance), rather than the background scenery.

Camera processor(s) 14 or encoder/decoder 17 may output the unwarped frame of image data. For example, camera processor(s) 14 or encoder/decoder 17 may output the unwarped frame of image data at the desired output resolution (506). In some examples, camera processor(s) 14 or encoder/decoder 17 may output the frame of image data at the desired output resolution to system memory 30. In another example, camera processor(s) 14 may perform the scaling operation and output the unwarped frame to encoder/decoder 17. In some examples, encoder/decoder 17 may perform the scaling operation and encode frames of image data. In such instances, encoder/decoder 17 may output the unwarped frames to system memory 30 or to an encoding engine.

Figure 6:
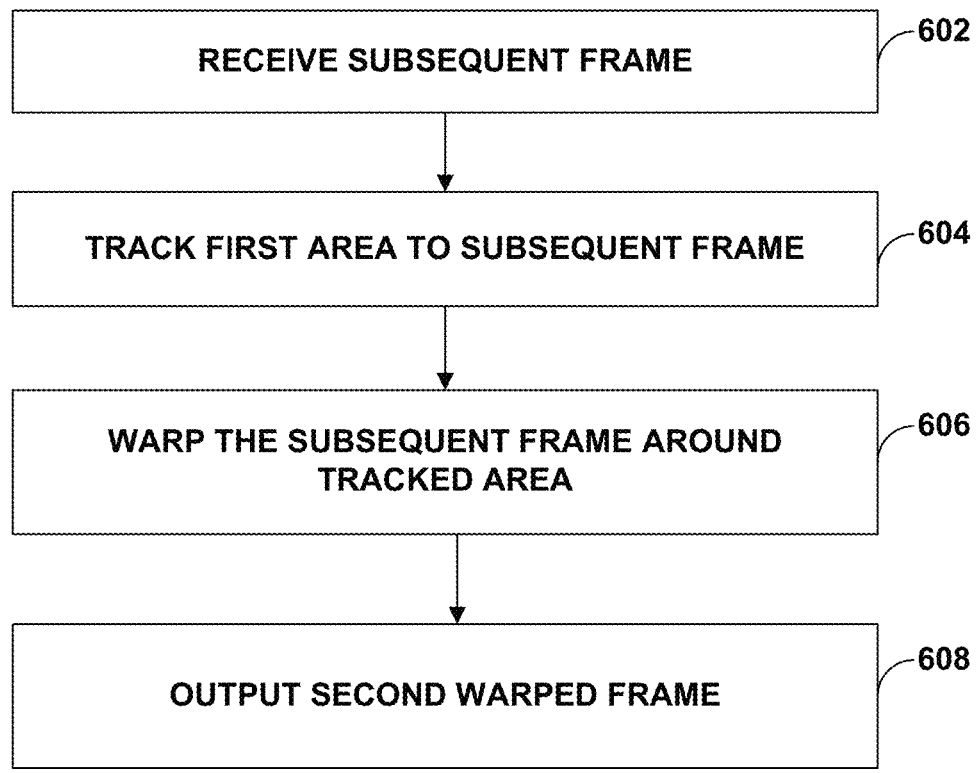
FIG. 6 is an example flowchart illustrating an example methods and techniques for tracking indicated area(s) to subsequent frames and warping subsequent frames based on the tracked area(s), in accordance with various aspects of the techniques described in this disclosure.

FIG. 6 is an example flow diagram illustrating example operations of camera processor(s) 14, image sensor(s) 12, encoder/decoder 17, and/or system memory 30, shown in FIG. 1 performing warping grid operations using subsequent frames of image data. Camera processor(s) 14 may receive a subsequent frame of image data from image sensor(s) 12 (602). The subsequent frame of image data may include at least a portion of the previously indicated area. In an illustrative example, the indicated area may include at least a portion of a face indicated by an automatic or semi-automatic facial recognition operation configured to identify faces that may appear in a frame of image data and track the one or more faces across multiple frames of the image data. In such instances, AOF identification system 34 and/or AOF tracking system 36 may perform the facial recognition operation.

Camera processor(s) 14 may track the previously indicated first area of the frame from a first frame to a subsequent frame (604). In some examples, the indicated area may be a user-selected area or automatically detected area in a first frame. In such examples, the indicated area may move relative to the frame parameters, such as with movement of an object captured in the frame. In another example, the frame may move, such as by movement of camera 15, by a zoom operation, etc. In any event, camera processor(s) 14 may track the indicated area to the subsequent frame. For example, AOF tracking system 36 may track the indicated area to the subsequent frame.

In such examples, camera processor(s) 14 may warp the subsequent frame around the tracked area (606). In one example, camera processor(s) 14 may apply an updated warping grid around the tracked area or may apply another warping technique to the subsequent frame so as to indicate various scaling levels for various areas of the warped frame. In some examples, camera processor(s) 14 may be capturing video and may apply a warping grid to each frame of image data captured for the video recording to create continuously updating warped frames. That is, an updated warping grid may be a warping grid that warps one or more frames around indicated areas tracked across frames of the image data. In one example, a user may select a face of a person in one frame of video data as the area of importance, where, for example, the AOF tracking system 36 may automatically detect and track the face of the person for the frame and each subsequent frame thereafter. Similar to the output of the first warped frame for the first frame of image data, camera processor(s) 14 may output the second warped frame (608). The second warped frame may be processed similar to the way in which camera processor(s) 14 or encoder/decoder 17 processes the first warped frame using scaling and inverse distortion operations.

Figure 7:
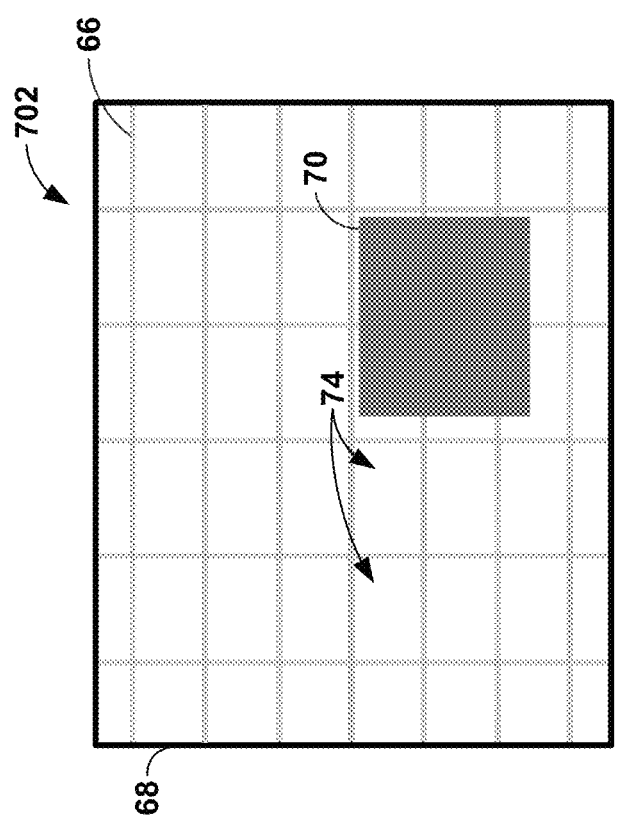
FIG. 7 is an example illustration depicting at least a portion of a frame, an area indicated as an area of importance, and an unwarped frame of example image data, in accordance with various aspects of the techniques described in this disclosure.
Figure 8:
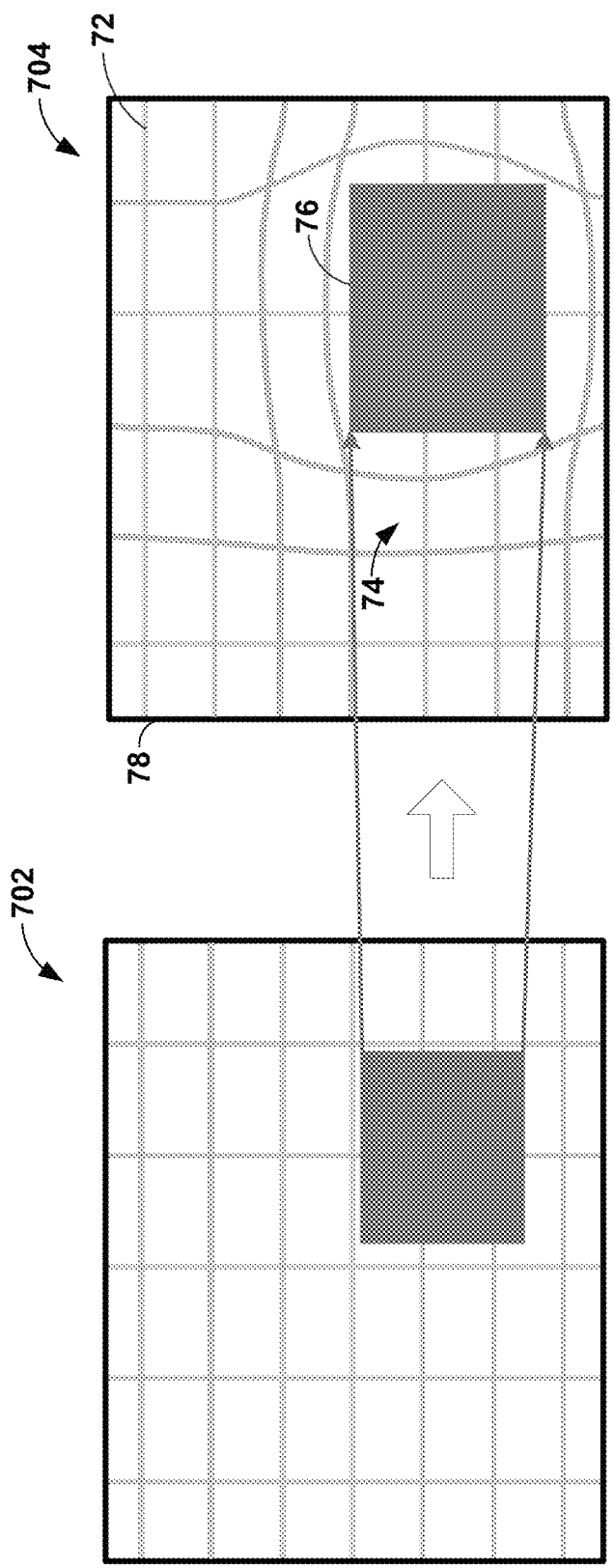
FIG. 8 is an example illustration depicting at least a portion of a frame and a grid warping around an indicated area of importance in order to selectively allocate processing resources to the indicated area, in accordance with various aspects of the techniques described in this disclosure.

FIGS. 7 and 8 illustrate example conceptual diagrams of an example warping application. In some examples, IFE 40 may perform a frame warping operation by deploying frame warping processor 44A. Frame warping processor 44A may warp a frame of image data received from one of image sensor(s) 12. In another example, IPE 42 may perform the frame warping operation upon receiving an unwarped frame of image data from IFE 40. For example, IPE 42 may warp a frame of image data as IPE 42 reads the input data received from IFE 40 that includes the frame of image data.

While visually depicted as a warping grid in FIGS. 7 and 8, the techniques of this disclosure are not so limited, and as discussed previously, the warping application may involve other warping techniques, such as a virtual lens distortion. For sake of conciseness, the illustrative examples of FIGS. 7 and 8 may refer to a warping grid in order to visually illustrate how a frame may be warped around one or more areas of the frame.

FIG. 7 is an example conceptual illustration 702 of an example portion of a frame 68 of image data. The frame 68 of image data may be captured by image sensor(s) 12 and output to camera processor(s) 14. In the illustrative example of FIG. 7, frame 68 of image data includes an area 70 of frame 68 that has been indicated as having a higher degree of importance relative to other areas 74 of frame 68 adjacent indicated area 70. In one example, indicated area 70 may include an area of frame 68, such as an area of importance, that has been indicated by a user. For example, a user may indicate area 70 using a tap, gaze, gesture, or voice input. In another example, the indicated area 70 of frame 68 may be an automatically detected area of frame 68, such as a face or at least a portion of a face included within frame 68. In some examples, the indicated area 70 may be a user-indicated area that is then automatically detected following the user input. The frame of image data may include areas of the frame defined by a conceptual grid 66 that partitions frame 68 into various compartments (e.g., areas 74). The compartments may be of uniform area throughout the frame and, in addition, the compartments of the frame may or may not be square area compartments and may include rectangular compartments as shown. In some examples, the area compartments of frame 68 may be evenly spaced having square dimensions (e.g., prior to warping).

FIG. 8 is an example conceptual illustration 704 of a warped frame 78 of image data created using a warping grid 72. Camera processor(s) 14 or encoder/decoder 17 may apply warping grid 72 to frame 68 to create warped frame 78. The indicated area 76 is also warped so as to be larger than pre-warped indicated area 70 in the original frame 68. This is because camera processor(s) 14 or encoder/decoder 17 apply warping grid 72 around indicated area 70 in order to allocate more area of the frame to the one or more indicated areas 76 while maintaining the same number of pixels from frame 68 to warped frame 78. That is, frames 68 and 78 are of the same size because both frames comprise a same number of pixels. In addition, the areas adjacent the area of importance, such as area compartment 74 is allocated less area (e.g., fewer pixels). That is, the warping of grid lines 72 in warped frame 78 illustrate the geometric displacement of pixels of frame 78, such that area 76 is allocated more pixels compared to area 74.

In some examples, camera processor(s) 14 may perform offline processing of the warped frame. For example, camera processor(s) 14 may perform spatial processing, temporal processing, sharpening, or denoising using the warped frame. In some examples, IPE 42B may perform offline processing using warped frame 78. In any event, warped frame 78 may be output to an encoder/decoder 17 or system memory 30 for further processing. For example, encoder/decoder 17 may be configured to perform scaling of warped frame, as described with reference to FIGS. 9 and 10, to achieve a desired output resolution. As such, camera processor(s) 14 may provide better processing, quality, resolution, etc. of a frame of image data. For example, IPE 42B may process indicated areas (e.g., areas of importance) with more pixels relative to areas adjacent the indicated areas as a result of the warped frame. In one example, IPE 42B may process the indicated area of importance with more processing resources because the frame warped around the indicated area causes the indicated area to be enlarged and thus, use more area of the frame relative to areas adjacent the indicated area. For example, the indicated area may appear, if depicted visually, as distorted and enlarged to proportional to the increase in pixels allocated the indicated area. That is, if twice the number of pixels were allocated the indicated area, the indicated area may be enlarged to twice the size if the warped frame were to be depicted visually. In such an illustrative example, the areas adjacent the indicated area may shrink to half the original size, such that the frame does not increase in size prior to the inverse warping and scaling operation.

IPE 42B may process the one or more variously indicated areas with higher resolution because IPE 42B may process more pixels for the indicated area(s) relative to shrunken areas of the frame adjacent the indicated area(s), the adjacent areas having fewer pixels allocated relative to the unwarped frame received from one of image sensor(s) 12. In any event, the warped frame may have a same number of total pixels as the unwarped frame configuration.

A person of skill in the art would understand that although only one object of importance is shown to represent the area of importance, the area of importance may comprise multiple connected or disconnected areas of the frame and may both be of amorphous shapes, hollow shapes, etc. In addition, while the conceptual warping grid 72 is shown as having disparate lines, the grid and warping grid may actually have sparse data points that may be as numerous as the number of pixels of image sensor(s) 12. In some examples, the grid 66 may only be applied to portions of the frame, such as only to portions of the frame that would be relevant after a digital cropping operation to achieve a desired zoom level. In some examples, camera processor(s) 14 may apply warping and/or inverse warping operations coupled with identity mapping operations. For example, camera processor(s) 14 may use identity mapping to maintain pixels at particular locations relative to a frame of image data. In some examples, the warping operation may cause a displacement of pixels according to input and output mapping coordinates of a warping frame. In such examples, camera processor(s) 14 may use identity mapping to control the warping of an indicated area of a frame, such that no pixel displacement occurs for the indicated area of the frame during the unwarping process.

Figure 9:
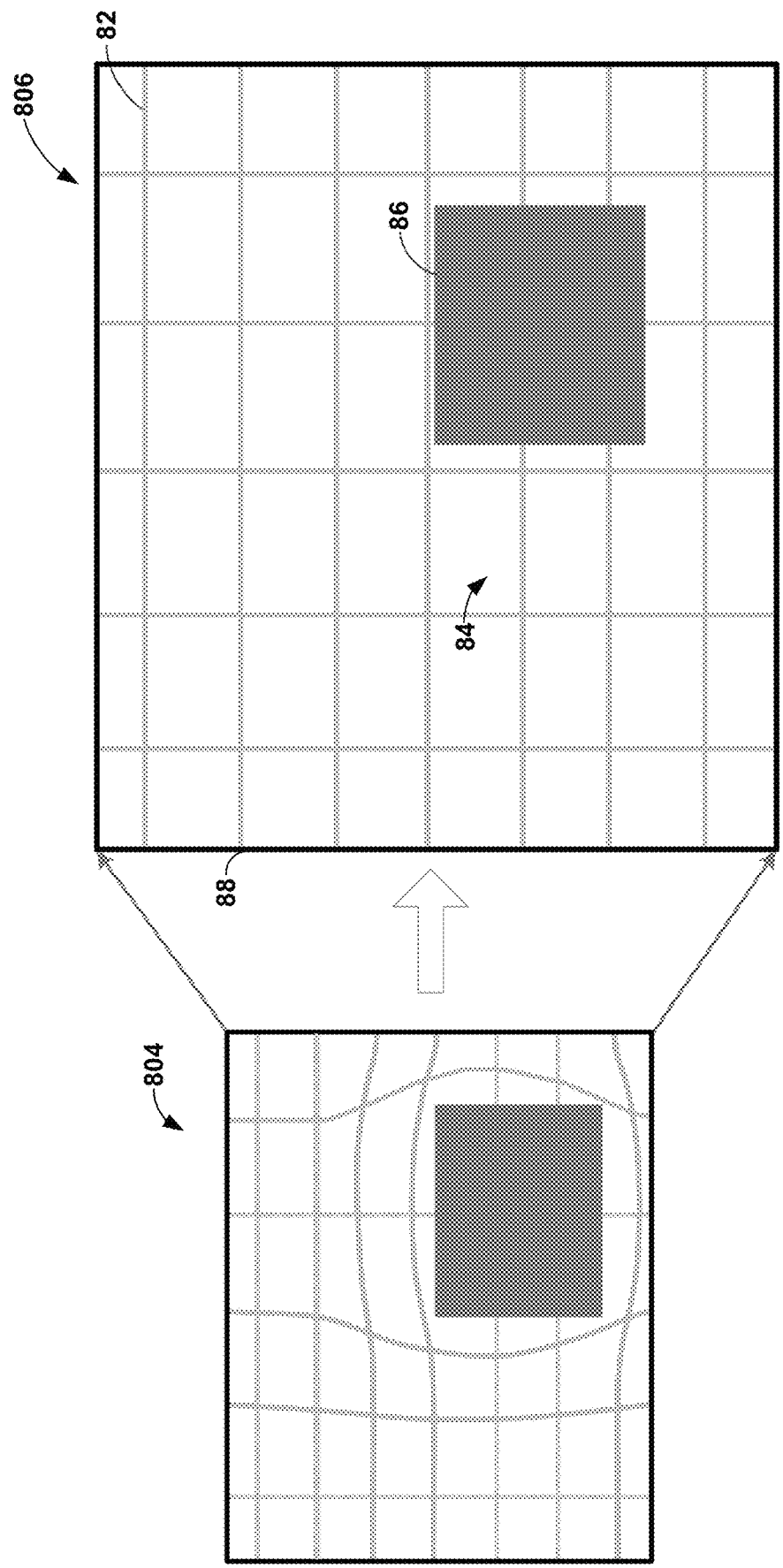
FIG. 9 is an example illustration depicting at least a portion of a scaled frame having various levels of digital scaling applied in accordance with warping grid areas, in accordance with various aspects of the techniques described in this disclosure.

FIG. 9 is an example conceptual illustration of a warped frame 804 undergoing a scaling and unwarping process to achieve a desired output resolution. In some instances, the desired output resolution corresponds to an output resolution that utilizes more pixels relative to a number of pixels output from image sensor(s) 12. For example, a 4K sensor may be used to produce 8K video. In such instances, camera processor(s) 14 may utilize upscaling to achieve the desired output resolution. In accordance with techniques of this disclosure, however, the upscaling levels used to upscale various areas of warped frame 78 may be different according to the area of each compartment formed by warped frame 78.

In the example of FIG. 9, the unwarped frame 806 is larger in size to illustrate the difference in output resolution from warped frame 804 to unwarped frame 806. In the illustrative example of FIG. 9, the unwarped frame 806 is twice as big as warped frame 804 to illustrate the difference in output resolution in one particular example, such as a 4K sensor producing 8K video (~2× difference in terms of pixel count). As such, the scaling process performed by camera processor(s) 14 or encoder/decoder 17 includes unwarping warped frame 804, such that warping is removed from the scaled output frame, such as is shown with unwarped frame 806.

In such examples, camera processor(s) 14 or encoder/decoder 17 may perform an inverse distortion operation by applying an inverse warping grid 82 to warped frame 804 to achieve an unwarped frame 88 at the desired output resolution. In performing the inverse distortion operation, camera processor(s) 14 or encoder/decoder 17 may perform scaling to frame 804 to upscale frame 804 to achieve frame 88 of a greater size. In a non-limiting and illustrative example, camera processor(s) 14 or encoder/decoder 17 may perform scaling to frame 804 to upscale frame 804 to achieve frame 88 of twice the size (e.g., twice the display pixel resolution). In doing so, camera processor(s) 14 or encoder/decoder 17 may perform more upscaling using more pixels to the areas of the warped frame 804 comprising indicated area 86 and more downscaling to areas adjacent the indicated area 84. As such, adjacent area 84 may have more blur and/or distortion as a result of the higher scaling level (e.g., more downscaling) used for the adjacent areas, and other surrounding areas, compared to indicated area of importance 86. The indicated area may increase in size due to the upscaling but at a lesser rate because the warped indicated area is enlarged as a result of the warping grid, as described with reference to FIG. 8.

In another example, scaling warped frame 804 to undistorted frame 88 may include camera processor(s) 14 upscaling at a relatively higher upscaling level that may in some instances, include no scaling, in portions of warped frame 804 that have been warped around the previously indicated area of warped frame 804. In addition, camera processor(s) 14 may downscale at a relatively higher downscaling level in portions of warped frame 804 corresponding to areas adjacent the indicated area of warped frame 804. As such, the indicated areas may be scaled at a first scaling level and the areas adjacent may be scaled at a second scaling level, where the first scaling level (e.g., an upscaling ratio or non-scaling ratio) may include a scaling level that is higher than the second scaling level.

In some examples, camera processor(s) 14 or encoder/decoder 17 may perform scaling using a first scaling level with respect to pixels corresponding to the indicated area. In some examples, the first scaling level may correspond to zero scaling or no scaling, such as a 1-to-1 scaling ratio. In addition, camera processor(s) 14 or encoder/decoder 17 may perform scaling using a second scaling level with respect to pixels corresponding to at least one area adjacent the indicated area. In such examples, the second scaling level may be different from the first scaling level. For example, the second scaling level may be greater than the first scaling level, such that more downscaling occurs with areas adjacent the indicated area and less downscaling occurs with the indicated area (e.g., prior to higher level processing). In some instances, the levels may be proportional to the size of respective compartments after applying a warping grid.

Figure 10:
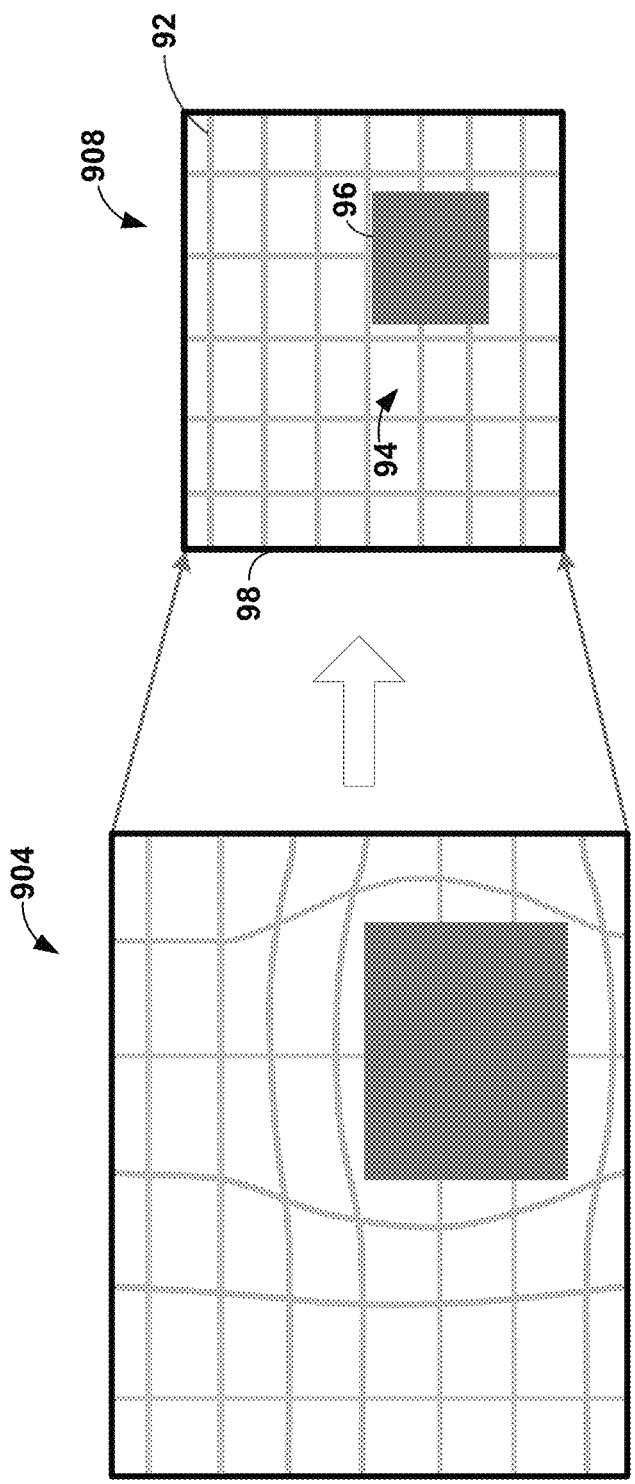
FIG. 10 is an example illustration depicting at least a portion of a scaled frame having various levels of digital scaling applied in accordance with warping grid areas, in accordance with various aspects of the techniques described in this disclosure.

FIG. 10 is an example conceptual illustration 908 of a warped frame 904 undergoing a scaling process to achieve a desired output resolution. For example, camera processor(s) 14 may comply with limited processing resources of a camera system by downscaling an image capture. In one example, camera processor(s) 14 may have limited processing capabilities for outputting high frame rates at high resolution and thus, may downscale the image to achieve a desired frame rate. In the example of FIG. 10, unwarped frame 98 may be smaller than warped frame 904 due to a scaling process. Camera processor(s) 14 perform scaling using a first scaling level with respect to pixels corresponding to the one or more indicated areas 96. Camera processor(s) 14 may perform downscaling using a second scaling level with respect to pixels corresponding to at least one area adjacent the indicated areas 94, where the second scaling level is greater than the first scaling level. For example, the scaling levels may include more downscaling in areas adjacent the indicated areas 94, including other surrounding areas, and less upscaling, or no scaling in some instances, with respect to pixels corresponding to the one or more indicated areas 96.

In some examples, encoder/decoder 17 may perform the scaling as encoder/decoder 17 reads input from camera processor(s) 14, such as while reading bits of data corresponding to warped frame 904. In any event, camera processor(s) 14 or encoder/decoder 17 may apply an inverse warping grid 92 to achieve unwarped frame 98.

A person of skill in the art would understand that image captures may include a snapshot capture or a video stream capture. For example, one or more cameras 15 of computing device 10 may implement the operations shown in FIGS. 7-10 while recording video, providing an image preview (e.g., before a user takes a photo, still photos, pictures-in-video, motion photos, etc.).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured for camera processing, the apparatus comprising:
   a memory; and
   one or more processors in communication with the memory, the one or more processors configured to:
      cause an image sensor to receive a frame of image data in response to a user input;
      receive, from the image sensor, the frame, wherein the received frame includes a first number of pixels based on an output resolution of the image sensor;
      warp the received frame around a first area to create a warped frame;
      scale the warped frame to create a scaled frame, wherein the scaled frame has more pixels than the first number of pixels;
      output the scaled frame for processing;
      determine one or more of a focus, exposure, or white balance setting based on the scaled frame; and
      cause the image sensor to receive a subsequent frame based on the one or more determined setting.

2. The apparatus of claim 1, wherein the one or more processors are configured to:
   scale using a first scaling level with respect to pixels corresponding to the first area; and
   scale using a second scaling level with respect to pixels corresponding to at least one area adjacent the first area, wherein the second scaling level is different from the first scaling level.

3. The apparatus of claim 1, wherein the one or more processors are further configured to:
   perform an inverse distortion operation that applies inverse warping to remove warping of the scaled frame to create an unwarped frame.

4. The apparatus of claim 3, wherein the one or more processors are configured to output the unwarped frame to one or more of a video encoder, a display device, or a memory device.

5. The apparatus of claim 1, wherein the one or more processors are further configured to:
   perform one or more of spatial processing, temporal processing, sharpening, or denoising on the scaled frame.

6. The apparatus of claim 1, wherein the one or more processors are further configured to:
   receive the subsequent frame of the image data, wherein the subsequent frame of image data comprises at least a portion of the first area;
   track the first area to the subsequent frame;
   warp the subsequent frame around the first area as tracked to create a second warped frame; and
   output the second warped frame.

7. The apparatus of claim 6, wherein the one or more processors are further configured to:
   perform no scaling with respect to pixels corresponding to the first area in the second warped frame; and
   perform downscaling with respect to pixels corresponding to an area adjacent the first area in the second warped frame.

8. The apparatus of claim 6, wherein the first area tracked to the subsequent frame includes at least a portion of a face.

9. The apparatus of claim 1, wherein the first area is identified based on a user selection.

10. The apparatus of claim 1, wherein the first area is based on an automatic detection process.

11. The apparatus of claim 1, wherein to warp the frame, the one or more processors are configured to:
   allocate more pixels to the first area and allocate fewer pixels to areas adjacent the first area.

12. The apparatus of claim 11, wherein to warp the frame, the one or more processors are configured to:
   apply a warping grid to the frame, the frame including the first area, and the warping grid configured to cause a geometric displacement of pixels relative to the received frame.

13. The apparatus of claim 12, wherein to create the warped frame, the one or more processors are configured to:
   apply the warping grid to the frame including to the first area and to at least one area of the frame adjacent the first area, wherein application of the warping grid results in more area of the warped frame being allocated to the first area relative to an amount of area of the warped frame allocated to the at least one area of the frame adjacent the first area.

14. A method for camera processing, the method comprising:
causing an image sensor to receive a frame of image data in response to a user input;
receiving, from the image sensor, the frame, wherein the received frame includes a first number of pixels based on an output resolution of the image sensor;
warping the received frame around a first area to create a warped frame;
scaling the warped frame to create a scaled frame, wherein the scaled frame has more pixels than the first number of pixels;
outputting the scaled frame for processing;
determining one or more of a focus, exposure, or white balance setting based on the scaled frame; and
causing the image sensor to receive a subsequent frame based on the one or more determined setting.

15. The method of claim 14, the method further comprising:
performing an inverse distortion operation that applies inverse warping to remove warping of the scaled frame to create an unwarped frame.

16. The method of claim 15, the method further comprising:
outputting the unwarped frame to one or more of a video encoder, a display device, or a memory device.

17. The method of claim 14, the method further comprising:
performing one or more of spatial processing, temporal processing, sharpening, or denoising on the scaled frame.

18. The method of claim 14, the method further comprising:
performing scaling using a first scaling level with respect to pixels corresponding to the first area; and
performing scaling using a second scaling level with respect to pixels corresponding to at least one area adjacent the first area, wherein the second scaling level is different from the first scaling level.

19. The method of claim 14, the method further comprising:
receiving the subsequent frame of the image data, wherein the subsequent frame of image data comprises at least a portion of the first area;
tracking the first area to the subsequent frame;
warping the subsequent frame around the first area as tracked to create a second warped frame; and
outputting the second warped frame.

20. An apparatus configured for camera processing, the apparatus comprising:
means for receiving a frame of image data including a first number of pixels based on an output resolution of an image sensor;
means for warping the frame around a first area to create a warped frame;
means for scaling the warped frame to create a scaled frame, wherein the scaled frame has more pixels than the first number of pixels;
means for outputting the scaled frame for processing;
means for determining one or more of a focus, exposure, or white balance setting based on the scaled frame; and
means for causing the image sensor to receive a subsequent frame based on the one or more determined setting.

21. The apparatus of claim 20, the apparatus further comprising:
means for outputting the scaled frame to one or more of a video encoder, a display device, or a memory device.

22. A non-transitory computer-readable storage medium having stored thereon instructions that, when executed, cause one or more processors to:
cause an image sensor to receive a frame of image data in response to a user input;
receive, from the image sensor, the frame, wherein the received frame includes a first number of pixels based on an output resolution of the image sensor;
warp the received frame around a first area to create a warped frame;
scale the warped frame to produce a scaled frame, wherein the scaled frame has more pixels than the first number of pixels;
output the scaled frame for processing;
determine one or more of a focus, exposure, or white balance setting based on the scaled frame; and
cause the image sensor to receive a subsequent frame based on the one or more determined setting.

23. The non-transitory computer-readable storage medium of claim 22, wherein the one or more processors are further caused to:
perform an inverse distortion operation that applies inverse warping to remove warping of the scaled frame to create an unwarped frame.

* * * * *